(12) United States Patent
Chaturvedi et al.

(10) Patent No.: US 7,301,935 B1
(45) Date of Patent: *Nov. 27, 2007

(54) METHOD AND SYSTEM FOR PROVIDING DIAL-UP DATA SESSIONS WITH DISTRIBUTED SERVICE

(75) Inventors: Pawan Chaturvedi, Overland Park, KS (US); Brian L. Senogles, Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 1131 days.

This patent is subject to a terminal disclaimer.

(21) Appl. No.: 10/086,017

(22) Filed: Feb. 28, 2002

Related U.S. Application Data

(63) Continuation-in-part of application No. 09/893,137, filed on Jun. 27, 2001, now Pat. No. 7,106,706.

(51) Int. Cl.
*H04L 12/66* (2006.01)
(52) U.S. Cl. ........................ 370/352; 370/401
(58) Field of Classification Search ................ 370/352, 370/354, 353, 355, 356, 328, 401, 493, 389, 370/494, 349, 338, 392; 455/450
See application file for complete search history.

(56) References Cited

U.S. PATENT DOCUMENTS

| | | |
|---|---|---|
| 5,533,019 A | 7/1996 | Jayapalan |
| 6,061,346 A | 5/2000 | Nordman |
| 6,226,260 B1 | 5/2001 | McDysan |
| 6,236,660 B1 | 5/2001 | Heuer |
| 6,434,139 B1 | 8/2002 | Liu et al. |
| 6,473,609 B1 | 10/2002 | Schwartz et al. |
| 6,529,497 B1 | 3/2003 | Hjelm et al. |
| 6,529,513 B1 * | 3/2003 | Howard et al. ............. 370/401 |
| 6,587,684 B1 | 7/2003 | Hsu et al. |
| 6,608,832 B2 | 8/2003 | Forslow |
| 6,614,781 B1 * | 9/2003 | Elliott et al. ................ 370/352 |
| 6,678,524 B1 | 1/2004 | Hansson et al. |
| 6,771,639 B1 * | 8/2004 | Holden ....................... 370/352 |
| 6,826,406 B1 | 11/2004 | Vialen et al. |

(Continued)

OTHER PUBLICATIONS

3Com Total Control, "Interworking Function, A wireless CDMA data solution," (1998).

(Continued)

*Primary Examiner*—Chi Pham
*Assistant Examiner*—Alexander O. Boakye

(57) ABSTRACT

A method and system for responding to a request to establish a dial-up data session from a user terminal to a remote destination. Instead of initiating a dial-up data session, the user terminal will initiate a packet-data session with a translation node that serves the remote destination and will provide the translation node with information about initiating the dial-up data session. The translation node will then initiate circuit-data session with the remote destination and will bridge the packet-data session with the circuit-data session, so as to establish an end-to-end data session between the user terminal and the remote destination. Advantageously, by setting up a packet-data session between the user terminal and the translation node, the underlying data may be carried over an access link at a higher service level than would normally be provided for a circuit-data session carried over that access link. Further, this can be done transparently to a user.

36 Claims, 9 Drawing Sheets

U.S. PATENT DOCUMENTS

| | | |
|---|---|---|
| 6,941,465 B1 | 9/2005 | Palekar et al. |
| 6,944,150 B1 * | 9/2005 | McConnell et al. ........ 370/352 |
| 2001/0043577 A1 | 11/2001 | Barany et al. |
| 2002/0085514 A1 | 7/2002 | Illidge et al. |
| 2002/0089958 A1 | 7/2002 | Feder et al. |

OTHER PUBLICATIONS

Office Action dated Jun. 2, 2005 from U.S. Appl. No. 09/893,137.
Office Action dated Nov. 22, 2005 from U.S. Appl. No. 09/893,137.

* cited by examiner

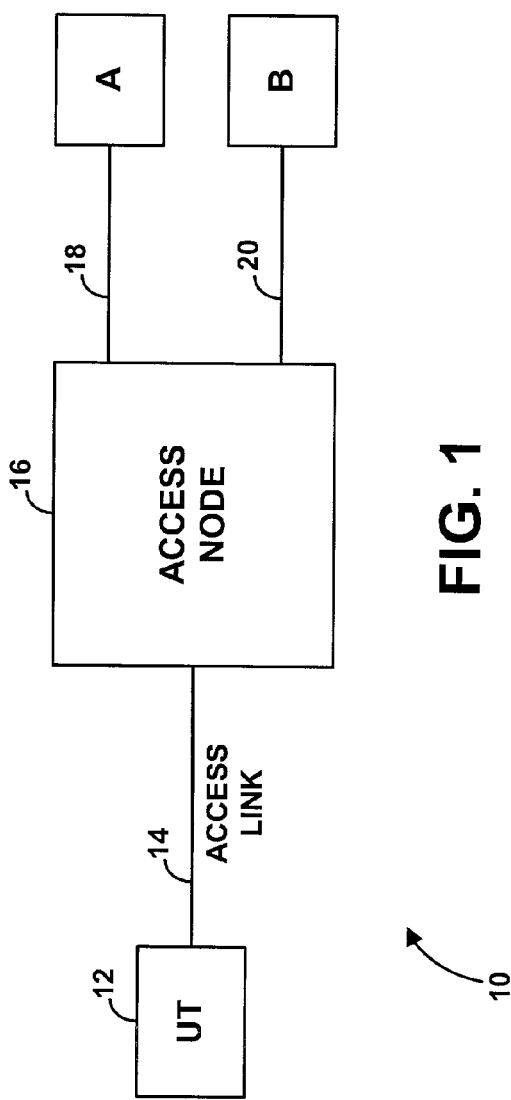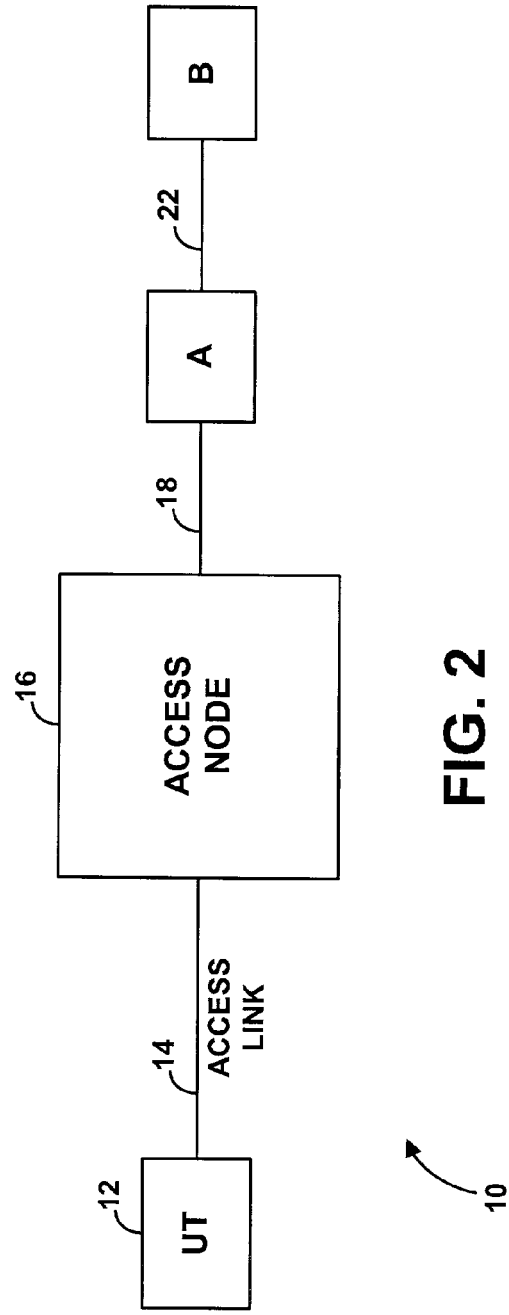

METHOD AND SYSTEM FOR PROVIDING DIAL-UP DATA SESSIONS WITH DISTRIBUTED SERVICE

RELATED APPLICATIONS

The inventors claim priority to and this application is a continuation in part of U.S. patent application Ser. No. 09/893,137, filed on Jun. 27, 2001 now U.S. Pat. No. 7,106,706, the entirety of which is hereby incorporated by reference.

BACKGROUND

1. Field of the Invention

The present invention relates to telecommunications and, more particularly, to the establishment of dial-up data sessions, such as between a wireless user terminal and a remote access server.

2. Description of Related Art

The explosive growth of telecommunications has ushered in a new era of convenience and productivity. Users are now commonly able to establish data sessions with remote computers via dial-up access over a telephone circuit. For instance, a user can operate a local computer equipped with a modem to place a telephone call to a remote computer equipped with a modem. When the remote modem answers the call, the remote modem and local modem can agree on a communication protocol and then begin to exchange useful data.

One of the most common applications of dial-up data service is to provide remote access to a network, such as a corporate network or the Internet, for example. In this arrangement, the remote computer/modem is typically a remote access server (also known as a "network access server"). The remote access server may sit as a node on the network and include one or more modems for receiving dial-up data calls from user terminals. When a user operates a local terminal to establish a dial-up data connection with the remote access server, the user may then be able to access resources on the network, such as e-mail and file services for instance.

The advent of wireless telecommunications, such as cellular telephony, has extended the availability of dial-up data access. Just as a user can operate a cellular telephone or other mobile station to place a voice call to virtually any telephone number, a user can operate a suitably equipped mobile station to place a dial-up data call to virtually any remote computer.

In typical operation, a user terminal such as a notebook computer or personal digital assistant ("PDA") can be connected to or otherwise equipped with a wireless modem or can include a modem and be coupled or otherwise equipped with a mobile station for placing wireless telephone calls. A user can then operate the terminal to place a wireless dial-up data call to a remote computer/modem.

In a cellular telephone system, each cell is defined by a radiation pattern from a respective base station antenna. The base station is then coupled or equipped with a switch or other gateway, which provides connectivity with a transport network such as the public switched telephone network ("PSTN") for instance. A wireless user terminal operating in a cell can thereby communicate with the base station over a radio frequency air interface, and communications can then be carried via the PSTN to virtually any remote communication terminal.

Thus, to place a dial-up data call from a wireless user terminal equipped with a modem, a user can instruct the terminal to call a telephone number of a remote computer equipped with a modem. The wireless terminal would then initiate a telephone call to that number via the air interface and switch. Once the remote modem answers the call, the two ends can agree on a communication protocol and then begin to exchange data.

SUMMARY

In most wireless communication systems, dial-up data connections are limited by the bandwidth allocated to circuit-switched calls over the air interface. This limitation stems from the fact that the primary type of traffic carried in such calls is voice, which, through use of effective vocoding (voice-coding) algorithms, can be transported over the air interface at low bandwidth with little degradation in quality. Constraining bandwidth for these calls enables service providers to efficiently use valuable and expensive radio spectrum. But since dial-up data calls are placed to a circuit-terminated destination like voice calls, dial-up data calls suffer from the same restriction on bandwidth.

For example, in a typical wireless communication system, voice calls—and thereby dial-up data calls—may be limited to a maximum throughput of 9.6 or 14.4 kilobits per second (kbps) over the air interface. By comparison, landline voice and dial-up data calls may be carried at speeds of up to 56 kbps over the PSTN (via a 64 kbps channel that can support high speed analog modems). As a result of this air-interface bottleneck, users who want to place dial-up data calls are more likely to place them over the landline telephone system than over a wireless communication system, which clearly presents a problem for wireless service providers.

The present invention is directed to an improved mechanism for providing dial-up data sessions in a way that approaches the performance of landline dial-up connections and therefore makes wireless dial-up data sessions much more attractive.

According to an exemplary embodiment of the invention, when a user instructs a user terminal to establish a dial-up data session with a given remote computer, the user terminal will not place a circuit-switched telephone call to that remote computer as would normally be expected. Rather, the user terminal will initiate a packet-switched data session with an intermediate node that serves the given remote computer and will provide that intermediate node (either directly or through one or more other intermediate nodes) with the telephone number of the remote computer. The intermediate node will then place a call to that telephone number, thus establishing a circuit-switched data session between the intermediate node and the remote computer, and the intermediate node will bridge the packet-switched data session with the circuit-switched data session. As a result, dial-up data will be communicated as packet-data from the user terminal to the intermediate node and then as circuit-data from the intermediate node to the remote computer, so as to establish an end-to-end data session between the user terminal and the remote computer.

Advantageously, in a typical wireless communication system, a higher bandwidth is allocated over the air interface for sessions designated as "data" sessions (e.g., packet-data) than for sessions designated as "voice" sessions. In fact, according to recent industry standard recommendations, such as 3G 1xRTT for instance, data sessions can be carried over the air interface with throughputs of up to 144 kpbs or greater. Thus, by setting up the end-to-end data session as a packet-data session over the air interface, it is possible to take advantage of this higher available data rate over the air interface.

By splitting the end-to-end data session into a packet-data session (generally a "data" session) over the wireless access segment and a circuit-data session (e.g. landline dialup session) terminating at the remote computer, the end-to-end throughput will be no worse than the lowest throughput of these two segments. If the packet-data session over the wireless access segment has a throughput higher than the circuit-data session, then the circuit-data session will be the bottleneck and the user will be provided with circuit-switched (landline-like) dialup experience. On the other hand, if the packet-data session over the wireless access segment has a throughput lower than the circuit-data session, then the packet-data session will be the bottleneck, but the user will provided with a wireless packet-data like experience. This arrangement can thereby increase wireless dial-up throughput many times beyond that traditionally available.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which:

FIG. 1 is a block diagram of a communication system for carrying communications between a user terminal and remote destinations;

FIG. 2 is a block diagram depicting a revised version of the system of FIG. 1, in accordance with the exemplary embodiment;

Figure 3:
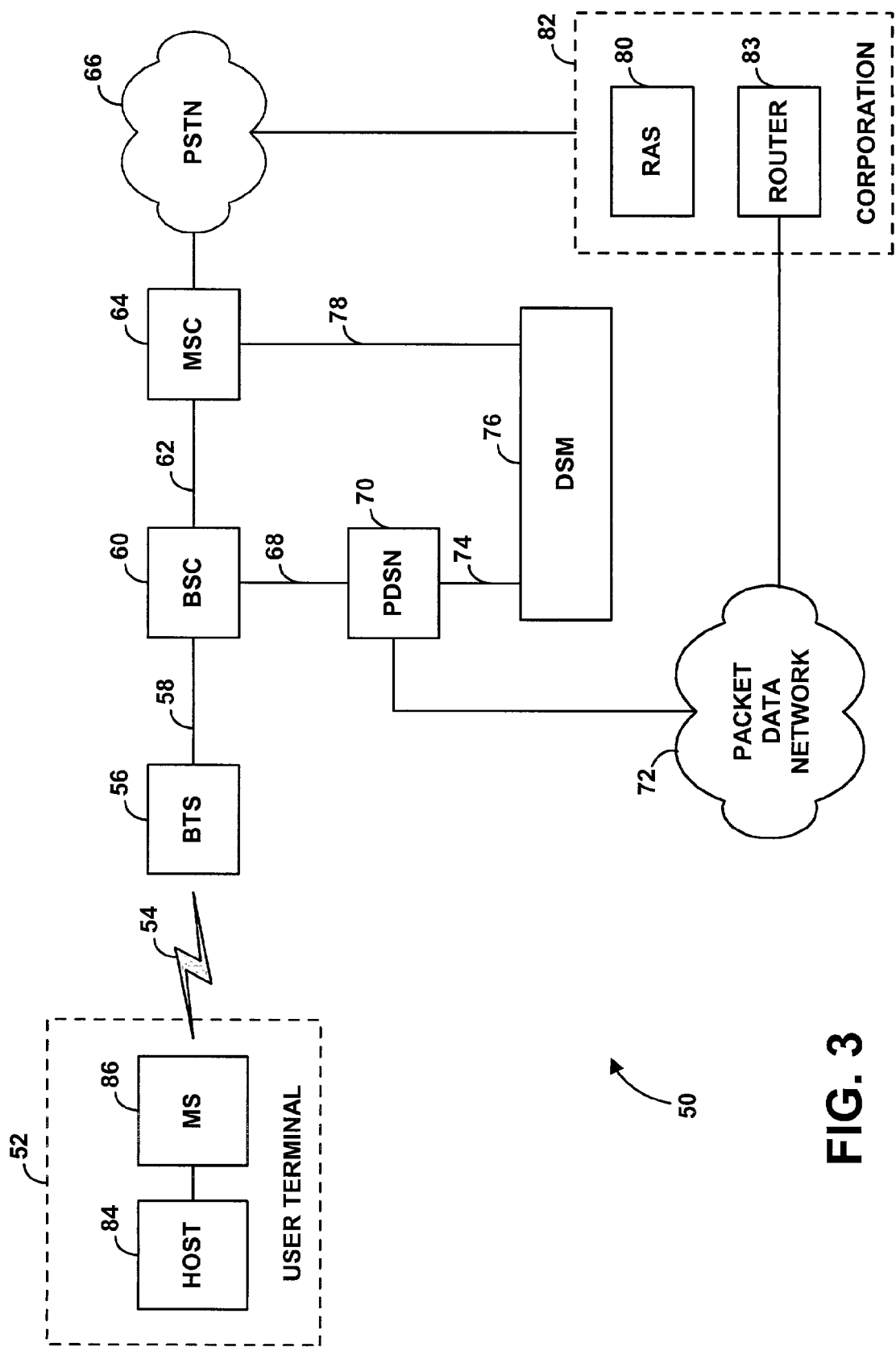
FIG. 3 is a block diagram of a wireless communication system suitable for carrying out the exemplary embodiment.

DETAILED DESCRIPTION OF AN
EXEMPLARY EMBODIMENT

1. Overview

Referring to the drawings, FIG. 1 is a generalized block diagram of a communication system 10 suitable for carrying communications between a user terminal 12 and a plurality of destinations, represented by exemplary destinations A, B. The term "destination" is used to describe nodes A and B, because user terminal 12 is assumed to initiate communications to a given destination; in the exemplary embodiment, however, communications can pass in both directions between the user terminal and a given destination.

As shown in FIG. 1, user terminal 12 is coupled by an access link 14 to an access node 16. Access node 16 is then coupled by a link 18 to destination A and a link 20 to destination B. With this arrangement, communications can pass between user terminal 12 and destination A along the path comprising the access link 14, the access node 16 and link 18. Similarly, communications can pass between user terminal 12 and destination B along the path comprising the access link 14, the access node 16, and link 20.

It should be understood that this and other arrangements and processes described herein are set forth for purposes of example only, and other arrangements and elements (e.g., machines, interfaces, functions, orders of elements, etc.) can be added or used instead and some elements may be omitted altogether. Further, as in most telecommunications applications, those skilled in the art will appreciate that many of the elements described herein are functional entities that may be implemented as discrete components or in conjunction with other components, in any suitable combination and location.

In the arrangement of FIG. 1, destination A can be a different type of destination than destination B. For example, destination A can be a packet-terminated destination in that it sends and/or receives packets (e.g., IP packets or ATM cells) over link 18, while destination B can be a circuit-terminated destination in that it sends and/or receives channelized data streams (such as TDM signals for instance), whether or not framed, over link 20. Alternatively, the destinations can differ in other ways.

In turn, user terminal 12 can engage in various different types of communication sessions. Sessions can be distinguished based on the way both ends communicate (e.g., packet or circuit), based on the way only one end communicates, and/or based on other factors. As an example, if both user terminal 12 and destination A communicate data as a sequence of packets, a communication session between user 12 and destination A can be considered a packet-switched data session. And if both user terminal 12 and destination B communicate channelized data over a circuit, a communication session between user terminal 12 and destination B can be considered a circuit-switched data session.

As another example, if destination A communicates data as a sequence of packets, a communication session between user terminal 12 and destination A can be considered a packet-terminated data session. And if destination B communicates channelized data over a circuit, a communication session between user terminal 12 and destination B can be considered a circuit-terminated data session. Other examples are possible as well.

In a communication session that passes data over access link 14, the data may pass over the access link with a particular service level (or class of service), such as at a particular data rate or with some other designated quality of service. In the exemplary embodiment, the service level can be made to vary depending on the type of communication session or based on other factors. For example, upon setup of a given session, user terminal 12 might send a signaling message to access node 16, notifying access node 16 what type of communication session is being requested, and, based on the type of session, access node 16 might responsively instruct user terminal 12 to communicate at a particular service level over access link 14.

As a general matter, the service level over access link 14 may be better or more preferable (e.g., a higher data rate) for one type of communication session than for another type of communication session. Conversely, the service level for the other type of communication session may be lower or less preferable (e.g., a lower data rate). Thus, when user terminal 12 receives a request (e.g., a user request) to engage a given type of communication session, user terminal 12 and access node 16 might responsively communicate over access link 14 at the lower, less preferable level for that type of communication session, which can be undesirable.

For example, the service level over access link 14 may be a higher data rate for packet-switched communication sessions than for circuit-switched communication sessions. Similarly, the service level over access link 14 may be a higher data rate for packet-terminated sessions than for circuit-terminated sessions. Thus, when user terminal 12 receives a request to engage in a circuit-switched session and/or a circuit-terminated session with destination B, user terminal 12 and access node 16 might responsively communicate over access link 14 at the lower data rate, rather than at the rate.

The exemplary embodiment helps overcome this limitation. In accordance with the exemplary embodiment, when user terminal 12 receives a request to establish a specified type of communication session with a specified destination, at least two separate communication sessions (or legs) will be set up and bridged together to form an end-to-end communication path between the user terminal and the specified destination.

A first session will be set up between the user terminal and an intermediate entity, passing over the access link. And a second session will be set up between the intermediate entity and the specified destination. Preferably, the first session will be of a type other than the specified type, and particularly of a type that results in a better service level over access link 14 than would result for the specified type of session. In turn, the second session will preferably be the specified type of session. In the exemplary embodiment, the intermediate entity will perform the function of bridging together the first session and second session and may therefore be considered to be a "translation node."

This arrangement is illustrated by way of example in FIG. 2. FIG. 2 generally depicts a revised version of system 10, in which a communication link 22 is shown between exemplary destination 14 and exemplary destination 16. (Link 20 between access node 16 and destination B has been omitted from the drawing for clarity, although it can still remain).

Referring to FIG. 2, assume that user terminal 12 receives a request to establish a circuit-switched data session (e.g., a dial-up data session) with destination B. In response, user terminal 12 will send a signaling message to access node 16 requesting establishment of a packet-switched data session, rather than a circuit-switched data session as requested. The requested packet-switched data session will then be set up between user terminal 12 and destination A, rather than destination B, via access link 16. Further, destination A will establish a circuit-switched data session with destination B, and destination A will bridge the packet-switched data session with the circuit-switched data session by converting between packetized data on one side and channelized data on the other side.

Thus, in this example, an end-to-end data session will be established between the user terminal and destination B. User terminal 12 will communicate data as packets, and destination B will communicate data as channelized data over a circuit. Advantageously, since the first leg of the end-to-end data session is a packet-switched leg that passes over access link 14, the data of the session can be carried over the access link at a higher service level allocated for packet-data sessions, rather than at a lower service level allocated for circuit-data sessions. Further, this can all be done transparently to a user of terminal 12, in response to the user's request for a circuit-switched data session.

2. Exemplary Wireless Architecture

The exemplary arrangement shown in FIG. 2 can take various forms, as noted above. As an example, access node 16 can represent or be part of a telecommunications access system, such as a carrier's network (e.g., a local exchange carrier's network, an interexchange carrier's network, or a cellular wireless carrier's network). Further, destination A can be a node within the carrier's network or otherwise maintained by a carrier. The carrier may then receive a request from the user terminal to establish the specified type of session with destination B, and the carrier may responsively instead set up the first session between the user terminal and destination A and the second session between destination A and destination B.

The exemplary embodiment is particularly useful in the context of cellular wireless telephony, because, as noted above, the bandwidth that is allocated over the air interface between a mobile station and a base station is typically higher for packet-data sessions than for circuit-data (e.g., voice or dial-up) sessions. Applying the exemplary embodiment, when a wireless user terminal receives a request to establish a circuit-data session to a specified destination, the wireless user terminal can instead request a packet-data session. The wireless carrier can then set up the packet-data session with a intermediate node within the carrier's network, and the intermediate node can then set up a circuit-data session to the specified destination, bridging the two sessions together.

FIG. 3 is a generalized block diagram of a wireless communication system 50 suitable for carrying out the exemplary embodiment. As noted above, many variations on the arrangement and operation of this system are possible, so the following description should be viewed as exemplary only.

As shown in FIG. 3, system 50 includes a user terminal 52 coupled by an air interface 54 with a base transceiver station ("BTS") 56. The BTS is in turn coupled by a link 58 with a base station controller ("BSC") 60, and the BSC is coupled by a link 62 with a mobile switching center ("MSC") 64 that provides connectivity with the PSTN 66. BSC 60 is further shown coupled via a link 68 with a packet data serving node ("PDSN") 70 that provides connectivity with a packet data network 72 such as the Internet. In the exemplary embodiment, PDSN 70 is further coupled by a link 74 (which could be packet data network 72) with a dial-up session manager ("DSM") 76, which is in turn coupled by a link 78 with MSC 64. Finally, PSTN 66 is shown providing connectivity with a remote access server ("RAS," i.e., dial-up server) 80, illustrated by way of example as part of corporate network 82 that also includes a router 83.

User terminal 52 can take any of a variety of forms. As shown in FIG. 3, for example, user terminal 52 can include a host 84 linked with a mobile station ("MS") device 86. The host device can be a personal computer (such as a notebook computer), a PDA or other device. The MS device can be a cellular telephone, a cellular wireless PC card or add-on module (e.g., for a PDA) or other such device that is capable of communicating over air interface 54 and communication with host 84 (typically by a pin-out port or other connection, and a suitable message set (API)). As such, the host can be linked to the MS device by a cable or wirelessly, or the MS device can be attached to or integrated into or as part of the host. Alternatively, the user terminal can be a unitary device that is capable of communicating over air interface 54.

Figure 4:
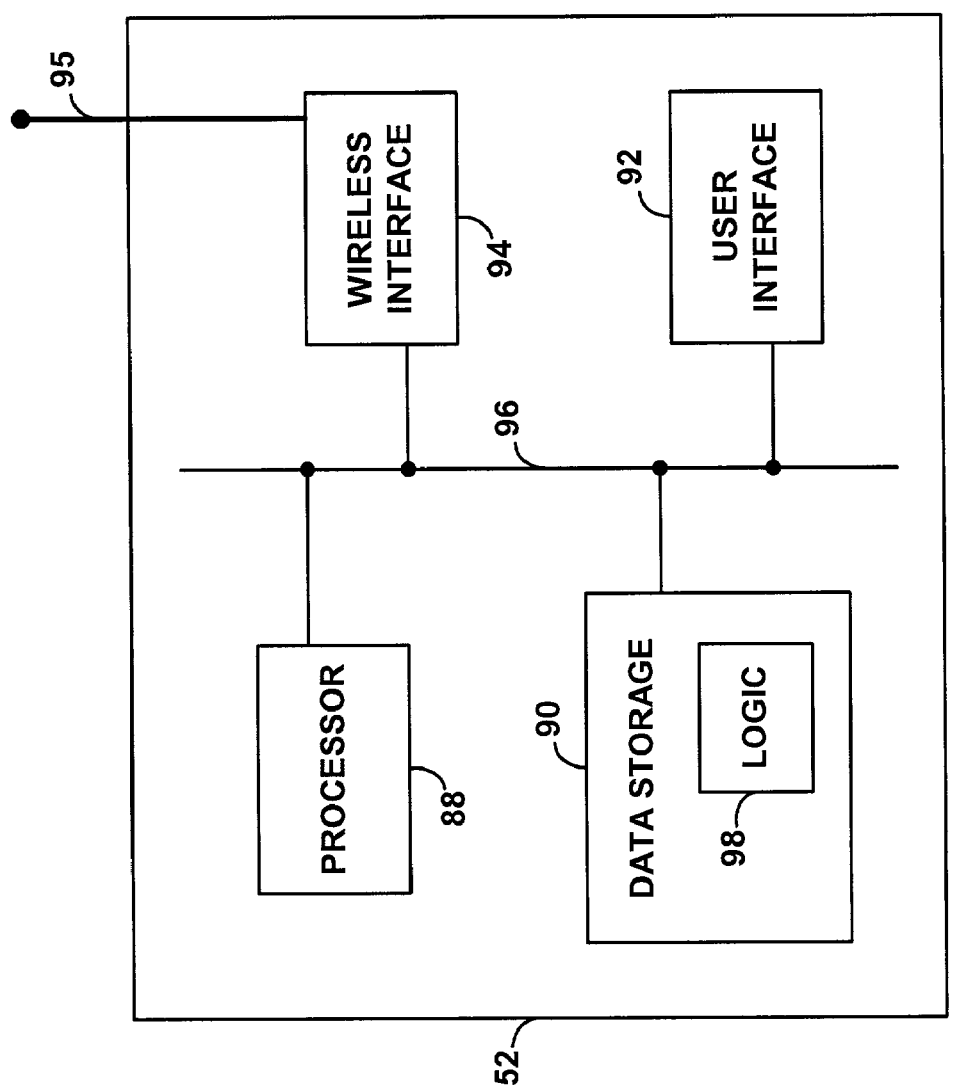
FIG. 4 is a block diagram of a user terminal for use in accordance with the exemplary embodiment.

FIG. 4 is a simplified block diagram of an exemplary user terminal 52. The functional blocks shown in the user terminal can be within host 84 or MS device 86 or otherwise part of the user terminal. As shown in FIG. 4, user terminal 52 includes a processor 88, data storage 90, user interface 92, and a wireless communication interface 94, each of which may be linked with a system bus 96.

Each of these components can take various forms. For instance, processor 88 may be an Intel Pentium class processor or a digital signal processor (which may integrate part or all of data storage 90) and data storage 90 may be memory and/or a storage drive. Further, user interface 92 can include a display or other mechanism (whether audio and/or visual) for presenting a graphical user interface ("GUI") to a user, as well as an input mechanism (e.g., keyboard, keypad, microphone, mouse, or touch-sensitive display) for receiving input from a user. Wireless communication interface 94 may include a transceiver (not shown) and an antenna 95 for sending and receiving signals over air interface 54.

In the exemplary embodiment, data storage 90 holds a set of logic (e.g. computer instructions) 98 executable by processor 88 to carry out various functions described herein, such as sending a GUI to user-interface 92 be presented to a user, receiving a user request to establish a dial-up data session, packetizing outgoing data (and depacketizing incoming data), including a "dial-up data session" identifier in each outgoing packet, and providing packets to wireless communication interface 94 for transmission over air interface 54 to DSM 76. In addition, the logic may also include a Telnet client application, to facilitate "logging onto" and communicating with a remote server such as DSM 76. All of this logic can be stored on host 84 as a connection-manager application, so as to receive and respond to a user-request for a dial-up data session.

BTS 56, BSC 60 and MSC 64 can be conventional components of a radio access network, such as may be provided by Sprint PCS for instance and therefore are not described in detail here. (As examples, the BTS can be a Motorola SC4812, SC611, SC614, SC4850, the BSC can be a Nortel BSS or a Motorola CBSC, and the MSC can be Lucent 5ESS.) BTS 56 and BSC 60 may cooperatively be considered a base station. BTS 56 will include an antenna for communicating over air interface 54 with user terminal 52, and BSC 60 will function to control BTS 56. MSC 64 will, in turn, provide circuit-switching and connectivity with PSTN 66. In an alternative arrangement, the functionality of BSC 60 may be incorporated within MSC 64.

For purposes of example, air interface 54 will be assumed to be a code division multiple access (CDMA) air interface, so the entities that communicate over the air interface will communicate according to an agreed CDMA protocol (i.e., the will be programmed with the message sets and/or other technology necessary for engaging in that communication). For instance, industry standards EIA/TL1/IS-2000a ("IS-2000") and IS-95, published by the Electronics Industry Association/Telecommunications Industry Association, define a suitable CDMA protocol. However, other air interface arrangements are possible as well.

In normal operation, when user terminal wants to establish a circuit-data session with RAS 80 (e.g., in response to a user request to place a telephone call to a telephone number of RAS 80 for instance), user terminal will send an origination message over air interface 54 to MSC 64 (via BTS 56 and BSC 60). Under IS-95, the origination message will include an "option service code," which will indicate that the session is a voice session (or generally circuit-switched, rather than "data"), and the origination message will indicate the telephone number of the RAS. In response, the base station will begin to communicate with the user terminal over air interface 54 at the voice bandwidth of, say, 9.6 or 14.4 kbps (such as in response to an instruction from MSC, or in response to BSC detection of the voice option service code in the origination message). Note that the voice bandwidth may itself vary depending on factors such as current congestion over the air interface or service-provider configuration, for instance.

Further, the MSC will send a signaling message (e.g., an ISDN User Part or "ISUP" setup message) over a signaling channel (e.g., SS7-based system through a signal transfer point (not shown)) to a switch (also not shown) that serves RAS 80, seeking to set up the circuit. Once the two ends agree to communicate (e.g., the RAS answers the call), circuit-switched communication then begins.

In a radio access network that provides packet-data connectivity (e.g., IS-2000), PDSN 70 can also be a conventional component, such as a Nortel Shasta 5000 or a CommWorks Total Control 1000. PDSN 70 normally functions as a gateway or router onto packet data network 72. As such, PDSN 70 may conventionally include a processor, a memory with program instructions executable by the processor, and a routing table for indicating where or how to route packets.

In existing practice, when user terminal 52 wants to establish a packet-switched data session with an entity on packet data network, such as router 83 for instance, user terminal 52 will similarly send an origination message to MSC 64 over air interface 54. The origination message, however, will include a "packet data" option service code and the network address of router 83. When MSC 64 receives the origination message, it will responsively instruct BSC 60 to pass the origination message to PDSN 70. PDSN 70 and user terminal 52 will then engage in a standard process to set up a point-to-point protocol ("PPP") data link. (The process of setting up a PPP session is conventional and therefore not described here.)

Further, the base station will begin to communicate with the user terminal over air interface at the data bandwidth of, say, 144 kbps (pursuant to 3G 1xRTT) for instance (in response to an instruction from MSC, or in response to BSC detection of the data option service code in the origination message). As with the "voice" bandwidth, the data bandwidth may also vary depending on various factors, such as air interface congestion for instance.

With the PPP session established, user terminal 52 will packetize user data to produce data packets (such as IP packets) and send the packets over the air interface to PDSN (via the BTS and BSC). Each packet will conventionally include in a header the network address of router 83. Thus, applying its routing table, PDSN will determine where to route each such packet onto packet network 72, for transmission to router 83. Similarly, packets coming from router 83 to user terminal 52 will be directed to PDSN 70 and then sent via the PPP session to the user terminal.

In the exemplary embodiment, DSM 76 will function as the intermediate entity to which a packet-switched session with user terminal 52 is terminated and from which a circuit-switched session with RAS 80 is originated. As such, DSM 76 preferably includes functionality to communicate packet-data, to communicate circuit-data, to convert between packet-data and circuit-data, to initiate a circuit-switched data session, and to maintain a record of correspondence between a given packet-data session and a given circuit-data session.

Figure 5:
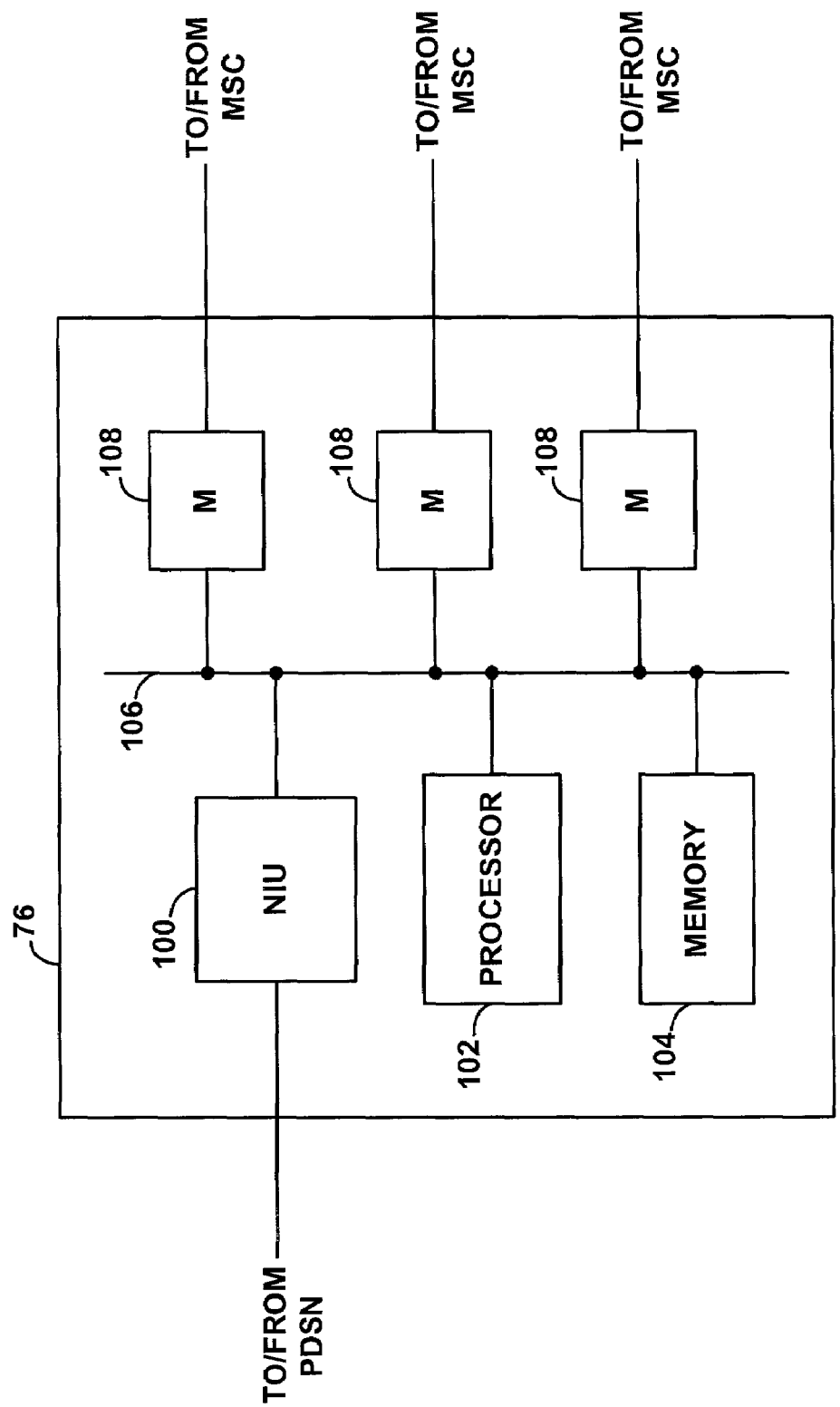
FIG. 5 is a block diagram of a dial-up session manager for use in accordance with the exemplary embodiment.

Referring to FIG. 5, a simplified block diagram of an exemplary DSM 76 is shown. Exemplary DSM 76 includes a network interface unit ("NIU") 100 for communicating packet-switched data with PDSN 70 over link 74. Link 74 may be an Ethernet link, in which case, NIU 100 can be an Ethernet port. DSM 76 further includes a processor 102 and a memory 104 containing program instructions executable by processor 102 to perform various functions described herein, such as initiating a circuit-switched session. Further, the program instructions may define a Telnet server application, to facilitate interacting with the Telnet client application on user terminal. The NIU, processor and memory can be combined together on an integral card, such as the EdgeServer card manufactured by 3Com Corporation for instance.

In the exemplary DSM 76, the NIU 100, processor 102 and memory 104 are coupled with a system bus 106. Also coupled with the system bus is a bank of high density modems (e.g., quad-modem cards) 108, each capable of communicating circuit-data over link 78. Link 78 can be a T1 line, in which case each modem is preferably capable of communicating channelized data over a T1 line. Each high density modem can be further capable of translating between packet-data and circuit-data. Thus, NIU 100 can receive packets and provide them to a modem 108, which can convert the packets into a digital bit stream (e.g., depacketize the packets and provide the underlying payload in a digital bit stream, or simply embed the entire packets in a digital bit stream) and send that bit stream over a T1 line to MSC 64, and vice versa.

Advantageously, DSM 76 can be based on a conventional entity that is also commonly used in cellular radio access networks providing packet-data connectivity, namely, an interworking function ("IWF"), such as the CommWorks Total Control 1000 for instance. An IWF, which is a network access server, generally functions to provide connectivity between an MSC and a packet-switched network such as the Internet in an environment where a mobile station does not itself communicate packetized data. It also translates between CDMA standards and PSTN standards for circuit data. The IWF communicates circuit-data with the MSC and communicates packet-data with the Internet. As such, an exemplary IWF will typically have the components shown in FIG. 5. However, rather than coupling the NTU with the Internet, the NIU can be instead coupled with an Ethernet link to the PDSN 70 as described above. Further, processor 102 can be programmed with an application to perform functions as also described above.

3. Exemplary Wireless Operation

Figure 6:
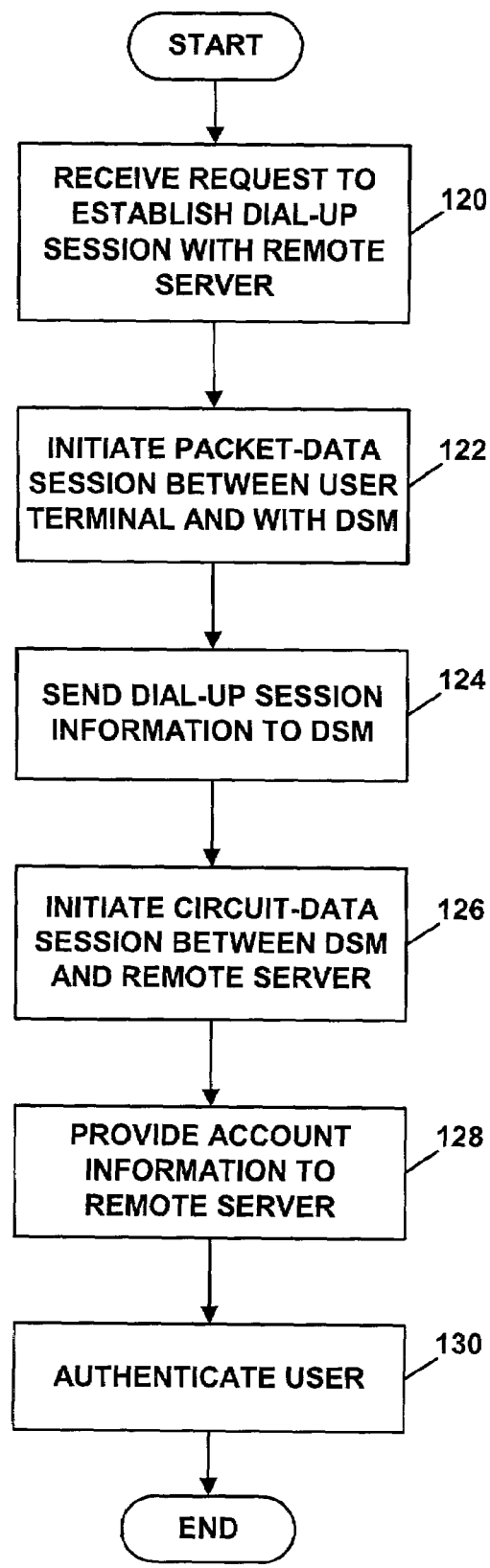
FIGS. 6-8 are flow charts depicting functions performed in accordance with the exemplary embodiment in the arrangement of FIG. 3.
Figure 7:
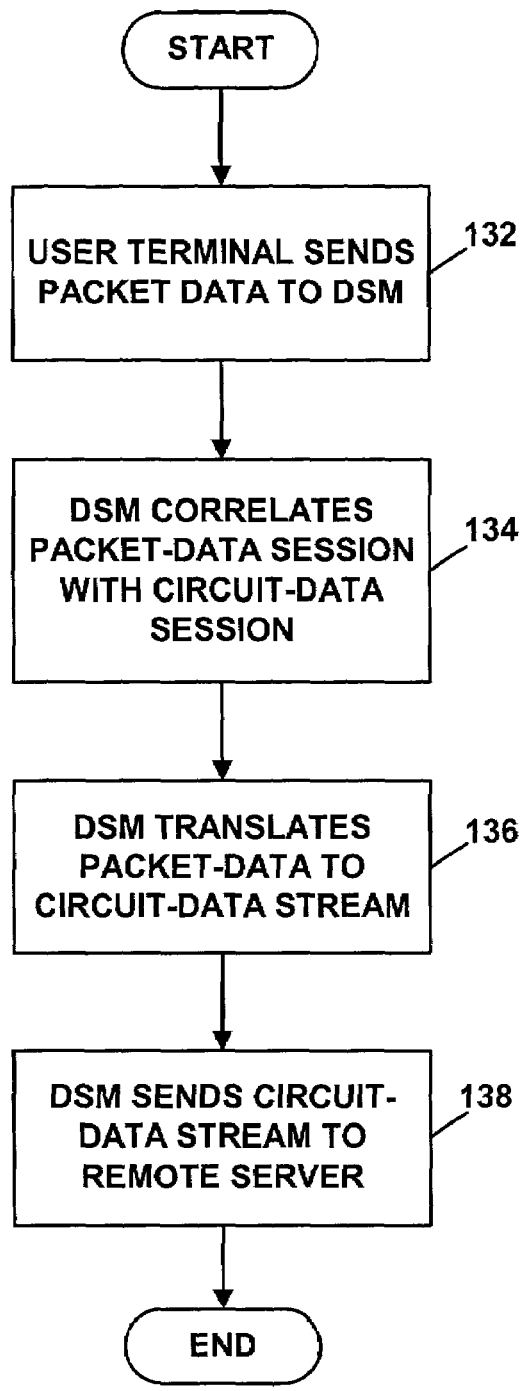
Figure 8:
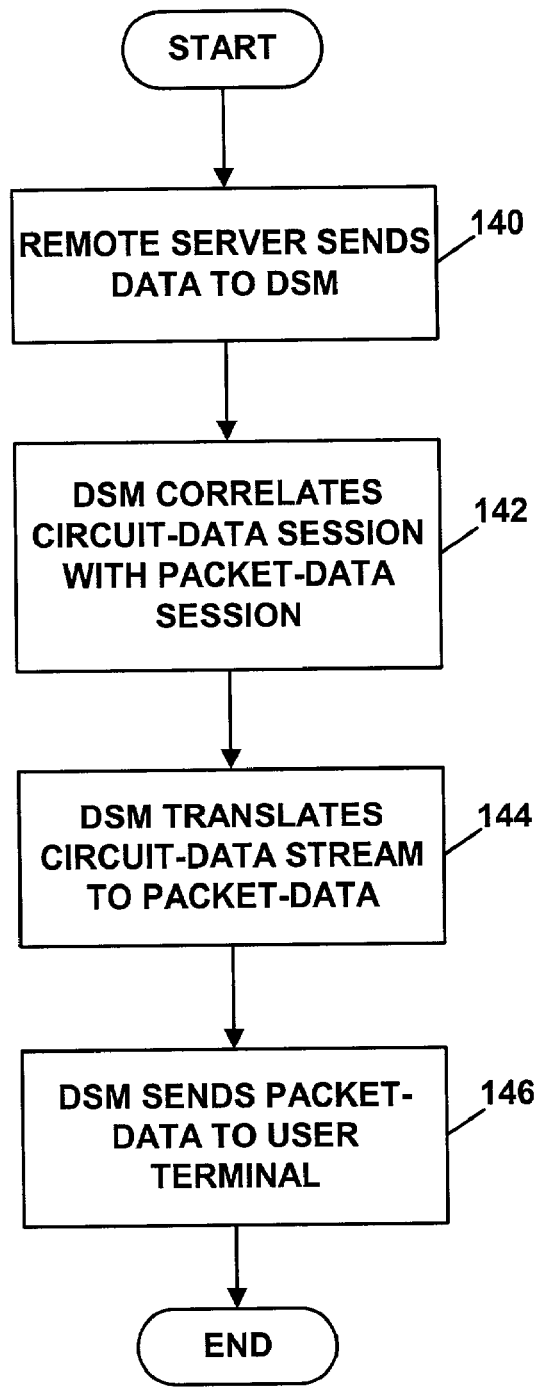

Referring now to FIGS. 6, 7 and 8, flow charts are provided to help illustrate exemplary functions that can be performed with the arrangement shown in FIG. 3. As shown in FIG. 6, at block 120, user terminal 52 first receives a request to establish a dial-up session with RAS 80. In the exemplary embodiment, the request can come from a user or from another machine.

For instance, a user can operate host 84 to invoke a dial-up data session application. The application may present the user with a GUI-form via user interface 92, which may include text boxes or other objects by which a user can enter the telephone number of RAS 80 as well as a username and password that the user normally employs as account information to gain access to the network served by RAS 80.

At block 122, in response to the request, the user terminal will initiate a packet-data session with DSM 76. Thus, in this example, the user terminal will send an IS-2000 origination message to MSC 64 via air interface 54, BTS 56 and BSC 60, including in the origination message a parameter identifying the session as a "packet data" session (rather than a voice/circuit session). In response, MSC 64 will instruct BSC 60 to pass the origination message to PDSN 70. PDSN 70 and user terminal 52 will then set up a PPP session.

In the exemplary embodiment, in order to complete establishment of the packet-data session between user terminal 52 and DSM 76, a mechanism will be provided to cause packets that are sent from user terminal 52 to PDSN 70 (in the PPP session) to be forwarded to DSM 76. To do so, user terminal 52 can be programmed to include in each packet of the data session a predetermined identifier, and PDSN 70 can be programmed to detect that predetermined identifier and responsively route the packet via link 74 to DSM 76.

Conveniently, the identifier can be a unique (e.g., normally non-routable) IP address, such as a private IP address of the form 10.x.x.x, as the destination address in each packet. By recording in the routing table of PDSN 70 that any packet destined to that IP address should be routed to DSM 76, the PDSN can be readily set to forward all such packets to the DSM. Alternatively, the identifier can take other forms as well, whether within each packet header or payload. Further, other methods can be employed to set up a packet-data session between the user terminal and the DSM.

The packet-data session between user terminal 52 and DSM 76 can have a unique session ID, assigned by DSM 76 for instance. In the exemplary embodiment, DSM 76 will store in its memory a record of the session ID, which DSM 76 can use to correlate the session with a circuit-data session established between DSM 76 and RAS 80.

At block 124, the user terminal will send to DSM 76 a set of information concerning the requested dial-up data session. This information preferably includes (i) the telephone number of RAS 80, (ii) the username, and (iii) the password. The user terminal can send this information to DSM 76 in any way, over any channel, before, during or after initiation of the packet-data session. In the exemplary embodiment, however, the user terminal will send the information as payload in packets to DSM 76.

For example, the user terminal may be programmed to include a dial-up data code at the beginning of a payload block of a packet, followed by the information. The DSM 76 may then be programmed to detect the dial-up data code as an indication that the remainder of the payload block defines the information. DSM 76 may then extract the information from the packet and store the information in memory.

And as another example, the user terminal and DSM may initiate in a Telnet session, and the user terminal may provide the information to the DSM as Telnet authentication information. For instance, once the DSM receives a first packet from the user terminal, the DSM may be programmed to send a Telnet authentication request to the user terminal, seeking a username and password for the Telnet session. In response, the user terminal may programmatically respond to the authentication request by providing as username the telephone number of the RAS, followed by the dialup username, and by providing as password the dialup password. The user terminal could include a predetermined delimiter between the telephone number of the RAS and the dialup username, so that the DSM can extract those two parameters.

At block 126, DSM 76 will then initiate a dial-up data session (i.e., a circuit-data session) to the telephone number of RAS 80. In particular, a modem of DSM 76 will send the telephone number as dialed digits over link 78 to MSC 64. MSC 64 will then engage in ISUP signaling to set up the circuit-data session to RAS 80. When a remote modem of RAS 80 answers, the remote modem and the DSM modem will agree on a communication protocol and will begin communicating.

At block 128, once the circuit-data session is established between DSM 76 and RAS 80, DSM 76 will provide RAS 80 with the username and password that it received from user terminal 52. At block 130, RAS 80 can then authenticate the user and allow the data session to continue.

Since the circuit-data session occurs over a circuit, DSM 76 can record in its memory an indication of the circuit (e.g., port, telephone line, etc.) over which the session is occurring. Further, DSM 76 will record a correlation between that circuit and the session ID of the packet-data session between the user terminal and the DSM, so that the DSM can bridge the two sessions together.

Referring now to FIG. 7, end-to-end data communication can thus occur from user terminal 52 to RAS 80. As shown in FIG. 7, at block 132, user terminal 52 will then packetize user data (data to be sent to RAS 80) and send resulting outgoing packetized data via the packet-data session to DSM 76. At block 134, upon receipt of the packets, DSM 76 will reference its memory and thereby determine that the outgoing packetized data corresponds to the circuit-data call with RAS 80. Thus, at block 136, DSM 76 will translate the outgoing packetized data into an outgoing circuit-data stream, and, at block 138, DSM 76 will send the outgoing circuit-data stream in the circuit-data session to RAS 80.

Similarly, referring to FIG. 8, end-to-end data communication can occur from RAS 80 to user terminal 52. At block 140, for instance, RAS 80 will send incoming circuit-data to DSM 76. At block 142, upon receipt of the incoming circuit-data, DSM 76 will reference its memory and thereby determine that the incoming circuit-data corresponds to the packet-data session with user terminal 52. Therefore, at block 144, DSM 76 will translate the circuit-data into incoming packetized data, and, at block 146, DSM 76 will route the incoming packetized data in the packet-data session to user terminal 52.

4. Adding Wireless Mobility

In the exemplary embodiment depicted in FIG. 3, a mobile-IP "home agent" of user terminal 52 can be interposed between PDSN 70 and DSM 76 in order to provide mobility during a data session. Applying mobile-IP principles, when DSM 76 is going to send a packet to user terminal 52, DSM 76 can instead send the packet to the terminal's home agent. The home agent can then conventionally forward the packet to the user terminal, wherever the terminal may currently be located. Similarly, when user terminal 52 is going to send a packet of data destined for RAS 80, user terminal 52 can send the packet via PDSN 70 to the home agent, and the home agent can forward the packet to DSM 76. Other methods of providing mobility are possible as well.

5. Alternative Distributed DSM Arrangement

With the arrangement discussed above, DSM 76 may reside locally in the radio access network that serves the user terminal. A drawback to this arrangement, however, is that RAS 80 might be located far from the DSM, so a circuit-switched call from the DSM to the RAS might be costly.

To help reduce this cost, according to an alternative embodiment, a number of DSMs (also referred to as gateways) can be distributed on packet data network 72, preferably one DSM per access network (e.g., per PDSN). When a user terminal seeks to initiate a dial-up data session in the manner described above, the user terminal will connect with a local DSM. The local DSM will then determine which DSM is located closest to the dial-up RAS. If the local DSM is the one located closest to the dial-up RAS, then the process can continue as described above. Alternatively, if some remote DSM is located closest to the dial-up RAS, then the local DSM can extend the packet-data session with the user terminal to the remote DSM (such as by bridging together (i) a packet session with the user terminal and (ii) a packet session with the remote DSM). And the remote DSM can be the one that places the circuit-switched call to the RAS.

Figure 9:
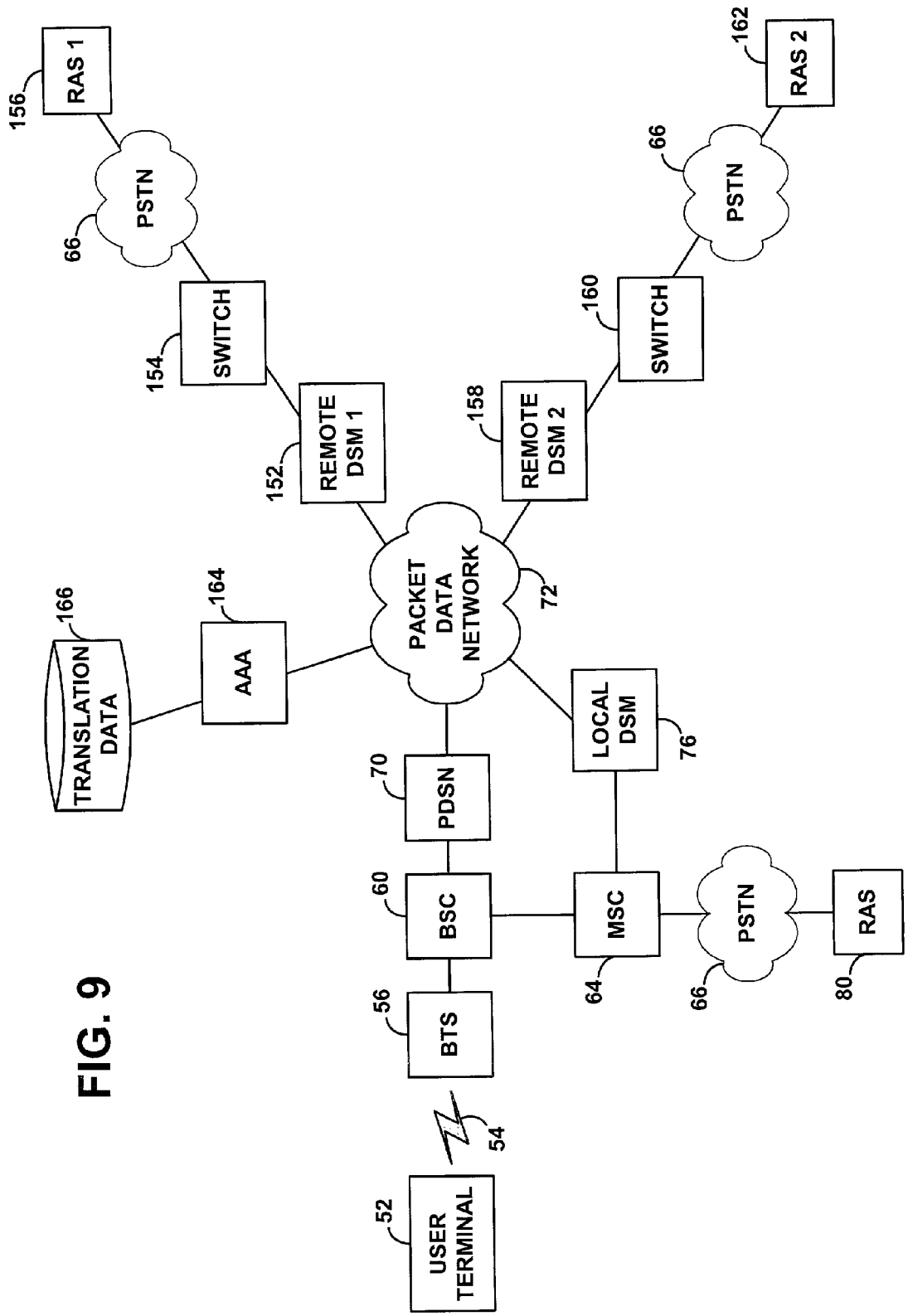
FIG. 9 is a block diagram of an alternative system suitable for carrying out the exemplary embodiment.

FIG. 9 is a generalized block diagram of an exemplary system 150 suitable for carrying out this alternative embodiment. (Again, as noted above, many variations on the arrangement and operation of this system are possible.) Like FIG. 3, FIG. 9 depicts user terminal 52 coupled by air interface 54 with BTS 56 and in turn with BSC 60. BSC 60 is then coupled with MSC 64, which provides connectivity with PSTN 66. And PSTN 66 is then linked with RAS 80. Additionally, as in FIG. 3, BSC 60 is linked with PDSN 70, which provides connectivity with packet data network 72.

Like FIG. 3, FIG. 9 also includes DSM 76, designated as "Local DSM," since it is local to the system served by MSC 64 and PDSN 70. However, unlike FIG. 3 where the DSM was shown linked (e.g., by an Ethernet link) directly with PDSN 70, FIG. 9 shows local DSM 76 as a node on packet data network 72, through which it can still communicate with PDSN 70. Further, as in FIG. 3, local DSM 76 is linked with MSC 64.

FIG. 9, in turn, illustrates two example remote DSMs, each sitting as nodes on packet data network 72. One remote DSM 152, designated as "Remote DSM 1," is linked with a switch 154, which provides connectivity via PSTN 66 with another RAS 156, designated as "RAS 1". And another remote DSM 158, designated as "Remote DSM 2," is linked with another switch 160, which provides connectivity via PSTN 66 with another RAS 162, designated as "RAS 2". Although not illustrated, remote DSM 1 and remote DSM 2 could also be linked to respective radio access networks, so as to function as local DSMs for local user terminals.

Also shown coupled to packet data network 72 is an Authentication, Authorization and Accounting (AAA) RADIUS server 164. In the exemplary embodiment, the AAA server may include or otherwise have access to a set of translation data 166, which correlates dialup RAS destinations with DSMs (such as by proximity or routing distance between a given DSM and a given RAS). For instance, the translation data could correlate various destination network addresses (e.g., telephone numbers on PSTN 66) with DSM network addresses (e.g., IP addresses on network 72). More particularly, the translation data could be a table that indicates, for each possible NPA-NXX (area code/prefix), an IP address of a DSM that should be used for calls to that NPA-NXX, which is preferably the DSM that is located the shortest or least expensive routing distance from the NPA-NXX. In the arrangement of FIG. 9, the translation data may thus correlate the NPA-NXX of RAS 1 with remote DSM 1, and the translation data may correlate the NPA-NXX of RAS 2 with remote DSM 2.

Note that although FIG. 9 shows the translation data as being accessible just to the AAA server, the translation data could alternatively sit on network 72 so that it could be accessible by other entities.

In the exemplary embodiment, each of the DSMs 76, 152 and 158 could largely or entirely function in the manner described above, with some variations. As one variation, when a local DSM, such as local DSM 76, receives a request from a user terminal, such as user terminal 52, the local DSM can programmatically query the AAA server so as to determine which DSM should function as the translation node between packet-data and circuit-data.

To do so, local DSM 76 could send a RADIUS request to AAA server 164, setting forth the NPA-NXX as username and password in the RADIUS request. The AAA server could programmatically respond to RADIUS request by referencing the translation data 166 so as to determine an IP address of the remote DSM that serves or should serve that NPA-NXX. And the AAA server may then send a RADIUS response to the querying local DSM, providing the IP address of the remote DSM in the RADIUS response. (Alternatively, the local DSM 76 could itself dip into the translation data 166, so as to determine the IP address of the remote DSM.

Note that the remote DSM could in fact be the local DSM. In the arrangement shown in FIG. 9, for instance, if the user terminal is seeking to establish a dialup data session with RAS 80, DSM 76 might learn from its query to AAA server 164 that it is the DSM that should function as the translation node. (Alternatively, the DSM might be programmed with logic indicating which "local" NPA-NXX's it serves, so that it need not query the AAA server when presented with a request to establish a dialup data session with an RAS having a local NPA-NXX.) The above discussion would then cover that scenario. The following discussion will focus on the instance where the remote DSM is other than the local DSM.

Once local DSM 76 identifies the IP address of the remote DSM, the local DSM can then bridge together or route packet communications between the user terminal and the remote DSM, so as to effectively enable a packet data session between the user terminal and the remote DSM. The local DSM may do this in various ways.

As one example, for instance, the local DSM could itself establish a Telnet session with the remote DSM. And the local DSM could provide the remote DSM with the dialup RAS telephone number, the dialup username and the dialup password, in the form of Telnet authentication information. The remote DSM could then place a circuit-switched call to the RAS. In turn, the local DSM could send packets that it receives from the user terminal in the Telnet session to the remote DSM. And the remote DSM could convert that packetized data into channelized data for transmission in turn to the RAS, and vice versa.

As another example, if and when the local DSM is first initiating a Telnet session with the user terminal, the local DSM could obtain Telnet authentication information from the user terminal in the manner described above, and the local DSM could obtain the IP address of the remote DSM and send the Telnet authentication data to the remote DSM. The remote DSM could then respond to the user terminal, so as to establish a Telnet session between the user terminal and the remote DSM. Processing can then continue as above.

Figure 10:
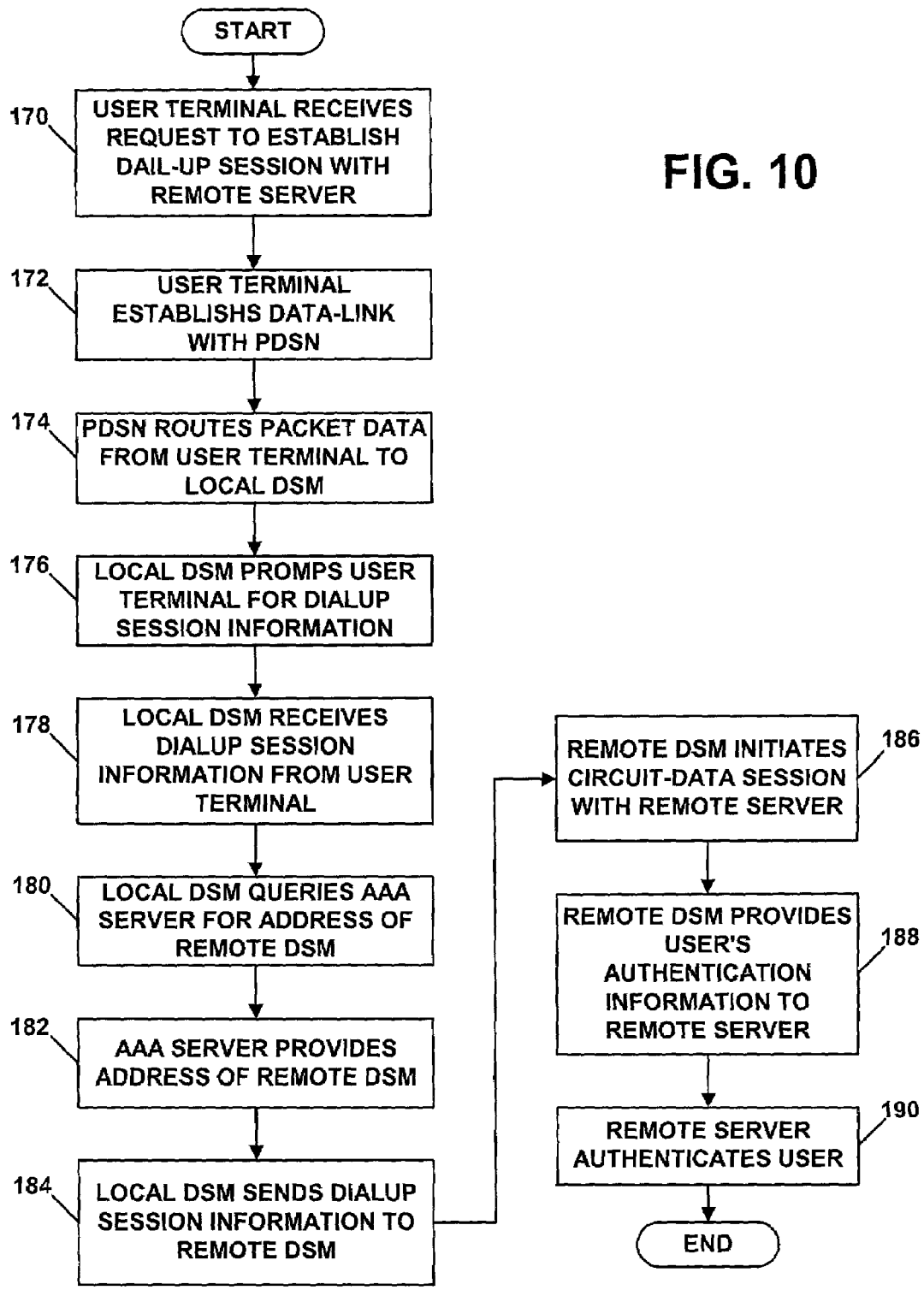
FIG. 10 is a flow chart depicting functions performed in accordance with the exemplary embodiment in the arrangement of FIG. 9.

Thus, referring now to FIG. 10, a flow chart is provided to help illustrate exemplary functions that can be performed with the arrangement shown in FIG. 9. As shown in FIG. 10, at block 170, assume user terminal 52 first receives a request to establish a dial-up session with RAS 162 ("RAS 2"). At block 172, in response to the request, the user terminal will establish a data link with packet data network 72 via PDSN 70 and will send to PDSN 70 packet data that includes a predetermined identifier such as a particular non-routable destination IP address. At block 174, upon detecting the predetermined identifier, the PDSN will route the packet data to local DSM 76.

At block 176, upon receipt of the packet data from user terminal 52, the local DSM 76 will then send a Telnet initiation prompt to the user terminal. And at block 178, the user terminal will respond by providing, as Telnet authentication data, the telephone number of the RAS 162.

At block 180, the local DSM 76 will then send a RADIUS request to the AAA server 164 to determine the IP address of a remote DSM that should function as the translation node for this communication, based on the NPA-NXX of RAS 162. And at block 182, after referencing translation data 166, the AAA server will provide the local DSM with a RADIUS response, indicating the IP address of remote DSM 158 ("Remote DSM 2"). In turn, at block 184, the local DSM 76 will send the user terminal's Telnet authentication information to remote DSM 158, thereby providing the remote DSM 158 with the telephone number of the RAS 162, and the local DSM 76 will also provide the user's dialup username and password, either as Telnet authentication information or as more raw packet payload, such as described above.

At block 186, remote DSM 158 will then initiate a dial-up data session (i.e., a circuit-data session) to the telephone number of RAS 162. In particular, a modem of remote DSM 158 will send the telephone number as dialed digits to switch 160. Switch 160 will then engage in ISUP signaling to set up the circuit-data session with RAS 162. When a remote modem of RAS 162 answers, the remote modem and the modem of remote DSM 158 will agree on a communication protocol and will begin communicating.

At block 188, once the circuit-data session is established between remote DSM 158 and RAS 162, remote DSM 158 will provide RAS 162 with the username and password that it received from user terminal 52. At block 190, RAS 162 can then authenticate the user and allow the data session to continue.

As above, since the circuit-data session occurs over a circuit, remote DSM 158 can record in its memory an indication of the circuit (e.g., port, telephone line, etc.) over which the session is occurring. Further, remote DSM 158 will record a correlation between that circuit and a session ID of the packet-data session between the user terminal and the remote DSM 158, so that the remote DSM 158 can bridge the two sessions together.

6. Conclusion

An exemplary embodiment of the present invention has been described above. Those skilled in the art will understand, however, that changes and modifications may be made to this embodiment without departing from the true scope and spirit of the present invention, which is defined by the claims.

We claim:
1. A method comprising:
(a) receiving a request to establish a circuit-data session between a user terminal and a specified destination;
(b) responsively (i) setting up a packet-data session between the user terminal and a translation node, (ii) setting up a circuit-data session between the translation node and the specified destination, and (iii) bridging the packet-data session with the circuit-data session,
wherein the translation node is one of multiple translation nodes disposed throughout a packet-switched network, the method further comprising selecting the translation node from the multiple translation nodes based on the specified destination.

2. The method of claim 1, wherein setting up a packet-data session between the user terminal and the translation node comprises (i) setting lip a first packet-data session between the user terminal and a local gateway, (ii) setting up a second packet-data session between the local gateway and the translation node, and (iii) bridging together the first packet-data session and the second-packet data session, whereby packets then flow between the user terminal and the translation node via the local gateway.

3. The method of claim 1, wherein selecting the translation node from the multiple translation nodes based on the specified destination comprises selecting the translation node from the multiple translation nodes based on proximity of the specified destination to the translation node.

4. The method of claim 1, wherein selecting the translation node from the multiple translation nodes based on the specified destination comprises referencing translation data that correlates the translation node with the specified destination.

5. The method of claim 1, wherein receiving the request comprises receiving the request at the user terminal.

6. The method of claim 5, wherein the request defines a telephone number of the specified destination, the method further comprising:
communicating the telephone number to the translation node,
wherein, setting up the circuit-data session between the translation node and the specified destination comprises the translation node placing a circuit-switched call to the telephone number.

7. The method of claim 6, wherein the request further defines user-account information, the method further comprising:
communicating the user-account information to the translation node;
communicating the user-account information from the translation node to the specified destination.

8. The method of claim 1, wherein the user terminal comprises a mobile station, and the specified destination comprises a dial-up server.

9. The method of claim 1, wherein setting up the packet-data session between the user terminal and the translation node comprises setting up the packet-data session over a communication path comprising an air interface.

10. The method of claim 9, wherein setting up the packet-data session between the user terminal and the translation node comprises the user terminal sending an origination message over the air interface to a radio access system, the origination message including a packet-data service code.

11. The method of claim 1, wherein receiving the request comprises receiving the request from a user, the method further comprising:
performing step (b) transparently to the user.

12. A method comprising:
(a) receiving a request to establish a circuit-data session between a user terminal and a specified destination;
(b) responsively (i) setting up a packet-data session between the user terminal and a translation node, (ii) setting up a circuit-data session between the translation node and the specified destination, and (iii) bridging the packet-data session with the circuit-data session,
wherein setting up the packet-data session between the user terminal and the translation node comprises (i) setting up a first packet-data session between the user terminal and a local gateway, (ii) setting up a second packet-data session between the local gateway and the translation node, and (iii) bridging the first packet-data session with the second packet-data session, whereby packets then flow between the user terminal and the translation node via the local gateway.

13. The method of claim 12, wherein the translation node is one of multiple translation nodes disposed throughout a packet-switched network, wherein the specified destination defines a destination network address, and wherein setting up the packet-data session between the user terminal and the translation node further comprises selecting translation node from among the multiple translation nodes, based on the destination network address.

14. The method of claim 12, wherein the translation node defines a translation node network address, and wherein selecting the translation node from among the many translation nodes, based on the destination network address, comprises determining the translation node network address based on the destination network address.

15. The method of claim 14, wherein the destination network address comprises a PSTN telephone number, and wherein the translation node network address comprises an IP address.

16. The method of claim 14, wherein determining the translation node network address based on the destination network address comprises:
consulting a translation table that correlates PSTN telephone numbers with translation node network addresses.

17. The method of claim 14, wherein determining the translation node network address based on the destination network address comprises:
providing to a network server an indication of the destination network address; and
thereafter receiving from the network server an indication of the translation node network address.

18. The method of claim 17, wherein the network server comprises an Authentication, Authorization and Accounting server, wherein the destination network address comprises NPA-NXX information, and wherein providing the network server with an indication of the destination network address comprises providing the network server with the NPA-NXX information.

19. A method comprising:
receiving into a user terminal a request to establish a dial-up data session between the user terminal and a dial-up data server, the dial-up data session defining data to be communicated between the user terminal and the dial-up data server;
packetizing outgoing data at the user terminal, to produce outgoing packetized data;
transmitting the outgoing packetized data from the user terminal to a local gateway;
selecting a remote gateway based on proximity of the remote gateway to the dial-up data server;
transmitting the outgoing packetized data from the local gateway to the remote gateway;
placing a circuit-switched call from the remote gateway to the dial-up data server;
translating the outgoing packetized data into an outgoing dial-up data stream at the remote gateway; and
in the call, sending the outgoing dial-up data stream from the remote gateway to the dial-up data server.

20. The method of claim 19, wherein the outgoing packetized data comprises a sequence of packets and the dial-up data stream comprises a digital bit stream, and wherein translating the outgoing packetized data into an outgoing dial-up data stream comprises:
  embedding the packets in the digital bit stream.

21. The method of claim 19, wherein the outgoing packetized data comprises a sequence of packets, each including a header and payload, wherein the dial-up data stream comprises a digital bit stream, and wherein translating the outgoing packetized data into an outgoing dial-up data stream comprises:
  depacketizing the packets to uncover the payload of each packet; and
  including the payload of the packets in the digital bit stream.

22. The method of claim 19, further comprising:
  in the call, receiving an incoming dial-up data stream at the remote gateway from the dial-up data server;
  packetizing the incoming dial-up data stream at the remote gateway, to produce incoming packetized data;
  transmitting the incoming packetized data from the remote gateway to the local gateway and, in turn, to the user terminal; and
  depacketizing the incoming packetized data at the user terminal.

23. The method of claim 22, wherein transmitting the incoming packetized data from the remote gateway to the local gateway and, in turn, to the user terminal comprises:
  transmitting the incoming packetized data through a home agent of the user terminal.

24. The method of claim 19, wherein the request to establish a dial-up data session between the user terminal and a dial-up data server defines a telephone number of the dial-up data server, and wherein placing a circuit-switched call from the remote gateway to the dial-up data server comprises:
  placing a circuit-switched call from the remote gateway to the telephone number of the dial-up data server.

25. The method of claim 24, further comprising:
  sending the telephone number from the user terminal to the local gateway; and
  sending the telephone number from the local gateway to the remote gateway.

26. The method of claim 25, further comprising establishing a Telnet session between the local gateway and the remote gateway, wherein sending the telephone number from the local gateway to the remote gateway comprises sending the telephone number as Telnet authentication information from the local gateway to the remote gateway.

27. The method of claim 19, wherein the request to establish a dial-up data session between the user terminal and a dial-up data server defines user-account information, the method further comprising:
  sending the user-account information from the user terminal to the remote gateway; and
  in the call, sending the user-account information from the remote gateway to the dial-up data server.

28. The method of claim 27, wherein the user-account information comprises a username and a password.

29. In a network of the type comprising an access link for communicatively coupling user terminals with an access node, wherein the access node provides connectivity with a plurality of destinations including packet-terminated destinations and circuit-terminated destinations, and wherein communications from a user terminal to a packet-terminated destination, when carried over the access link, are carried over the access link at a first service level, and communications from a user terminal to a circuit-terminated destination, when carried over the access link, are carried over the access link at a second service level different than the first service level, a method comprising:
  receiving a user request to establish a communication session from a user terminal to a specified circuit-terminated destination; and
  in response to the user request, (i) selecting an intermediate packet-terminated destination based on proximity of the intermediate packet-terminated destination to the circuit-terminated destination, (ii) setting up a first session from the user terminal to the intermediate packet-terminated destination via a communication path including the access link, so that the first session is carried over the access link at the first service level, (iii) setting up a second session from the intermediate packet-terminated destination to the specified circuit-terminated destination, and (iv) bridging the first session with the second session to produce an end-to-end session from the user terminal to the specified destination.

30. The method of claim 29, wherein the access link comprises an air interface.

31. The method of claim 29, wherein the user terminal comprises a mobile station and the access node comprises a base station.

32. The method of claim 31, wherein the user terminal further comprises a host device linked with the mobile station.

33. The method of claim 29, wherein the first service level comprises a first data rate for communication over the access link, and the second service level comprises a second data rate for communication over the access link, the first data rate being higher than the second data rate.

34. The method of claim 29, wherein the user request to establish a communication session from a user terminal to the specified circuit-terminated destination comprises a request to establish a dial-up data connection from the user terminal to a telephone number of the specified circuit-terminated destination.

35. The method of claim 34, further comprising receiving the user request at the user terminal.

36. A system comprising:
  a mobile user terminal programmed to respond to a request to establish a dial-up data session with a designated endpoint by instead initiating a first packet-data session with a packet gateway, wherein the packet gateway passes packet-data between the mobile user terminal and a local server;
  the local server being programmed to query an authentication server to identify a remote server that serves the designated endpoint, and the local server being further programmed to then establish a second packet-data session with the remote server, wherein the local server passes the packet-data between the gateway and the remote server; and
  the remote server being programmed to initiate a circuit-data session with the designated endpoint, to translate the packet-data into circuit-data, and to send the circuit-data to the designated endpoint in the circuit-data session.

* * * * *